United States Patent [19]
Winthrop et al.

[11] Patent Number: 5,235,357
[45] Date of Patent: Aug. 10, 1993

[54] SPECTACLE LENSES HAVING AN INSIDE-OUT CONICOIDAL FRONT SURFACE AND METHOD FOR FORMING SAME

[75] Inventors: John T. Winthrop, Wellesley; Richard B. Whitney, Southbridge, both of Mass.

[73] Assignee: American Optical Corporation, Southbridge, Mass.

[21] Appl. No.: 611,259

[22] Filed: Nov. 8, 1990

[51] Int. Cl.⁵ .................................. G02C 7/02
[52] U.S. Cl. ......................... 351/159; 351/177
[58] Field of Search .............. 351/159, 168–172, 351/176, 177

[56] References Cited

U.S. PATENT DOCUMENTS

| | | | |
|---|---|---|---|
| 3,950,082 | 4/1976 | Volk | 351/169 |
| 3,960,442 | 6/1976 | Davis | 351/159 |
| 4,289,387 | 9/1981 | Jalie | 351/159 |

OTHER PUBLICATIONS

"A New Decade of Aspheric Lenses", by Mo Jalie Optician Jan. 12, 1990.
"The Principles of Ophthalmic Lenses", by Mr. M. Jalie The Association of British Dispensing Opticians Chapter 21, Fourth Edition Jan. 1988.
"Aspherical surfaces used to minimize oblique astigmatic error, power error, and distortion of some high positive and negative power ophthalmic lenses", by Milton Katz Applied Optics, vol. 21, No. 16 Aug. 15, 1982.

*Primary Examiner*—Scott J. Sugarman
*Attorney, Agent, or Firm*—Fishman, Dionne & Cantor

[57] ABSTRACT

Plus and minus power ophthalmic spectacle lenses for the correction of distance vision incorporating a convex aspherical front surface are provided. The front surface of the invention is described mathematically as an inside-out conicoid. the inside-out conicoidal surface, when used in conjunction with a concave spherical or toroidal back surface, provides a lens having improved off-axis optical performance and reduced thickness and flatness characteristics relative to prior art lenses of the same back vertex power and refractive index.

27 Claims, 2 Drawing Sheets

SPECTACLE LENSES HAVING AN INSIDE-OUT CONICOIDAL FRONT SURFACE AND METHOD FOR FORMING SAME

FIELD OF THE INVENTION

This invention relates to the field of ophthalmic spectacle lenses, and in particular to spectacle lenses for the correction of distance vision.

BACKGROUND OF THE INVENTION

Spectacle lenses for the correction of blurred vision of distant objects conventionally employ two surfaces of spherical form when the eye is free of astigmatism, or one surface of spherical form and the other of toroidal form when astigmatism requiring correction is present. For a given value of back vertex power, the curvatures of the surfaces comprising a lens of this type are fixed by the designer using a predetermined standard of optical performance for vision through the peripheral areas of the lens ("off-axis performance"). Such lenses are termed "best form" lenses.

Conventional best form lenses tend to be bulky and cosmetically unattractive in the higher powers. Table 1 illustrates the point for typical best form hard-resin lenses (refractive index $n = 1.498$) having back vertex powers of $+5.00$ D and $-5.00$ D. The curvatures of the spherical surfaces of these lenses have been chosen, in the absence of chromatic aberration, to minimize the sum $|MOE| + |OAE|$, where MOE is the mean oblique error [arithmetic mean of the tangential (T) and saggital (S) errors] and OAE is the oblique astigmatic error $(T - S)$.

TABLE I

CHARACTERISTICS OF BEST FORM LENSES OF REFRACTIVE INDEX 1.498 AND 71 MM DIAMETER. CENTER OF ROTATION DISTANCE = 28.5 MM. OBJECT DISTANCE = 10,000 M.

| Back vertex power (D) | 1.53 power of front surface[1] (D) | Edge thickness (mm) | Center thickness (mm) | Flat plate thickness (mm) |
|---|---|---|---|---|
| +5.00 | 9.80 | 1.0 | 8.2 | 14.3 |
| -5.00 | 3.90 | 9.8 | 2.2 | 14.5 |

[1] 1.53 surface power is an industry standard defined by the expression $(n - 1)/r$, where $n = 1.53$ and $r$ is radius of curvature (in meters)

The table suggests that the $+5.00$ D lens will be bulbous in appearance owing to the relative strong front surface power (i.e., short radius of curvature), and the $-5.00$ lens will seem massive owning to its relatively thick edge. Both lenses exhibit a large flat plate thickness. (Flat plate thickness is the separation of two flat plates held against opposite sides of the lens.)

It is well known that the cosmetic appearance of the best form lenses can be improved by employing an aspherical surface of appropriate form in conjunction with a conventionally formed spherical or toroidal second surface. Davis (U.S. Pat. No. 3,960,442) discloses the basic concept of combining an aspheric surface with base curve selection to obtain desired design characteristics while maintaining optical performance. A specific lens series of the aspheric type described by Jalie (U.S. Pat. No. 4,289,387) utilizes a convex hyperboloidal front surface for plus power lenses, with the prescription to be formed on the back surface, and a concave hyperboloidal back surface for minus power lenses, with the prescription to be formed on the front surface. The use of the hyperboloidal surfaces provides lenses having reduced edge, center and flat plate thicknesses relative to those of their conventional best form counterparts. Moreover, by an appropriate choice of the "conic constant" associated with the hyperboloidal surface, the off-axis performance of the aspherical lens series can be made comparable to that of the conventional best form series.

The use of a concave hyperboloidal surface for minus power lenses presents a problem for prescription lens processing laboratories in that most laboratories lack the machinery necessary to generate, grind and polish the convex front surfaces of prescription lenses. The processing problem is resolved by incorporating a convex oblate ellipsoid on the front side of the lens, rather than a concave hyperboloid on the back side. Unfortunately, although the off-axis performance of such a lens can be adjusted by varying the conic constant of the oblate ellipsoid, the performance is not, in general, as good as that of the lens with concave hyperboloidal back surface.

SUMMARY OF THE INVENTION

Figure 1:
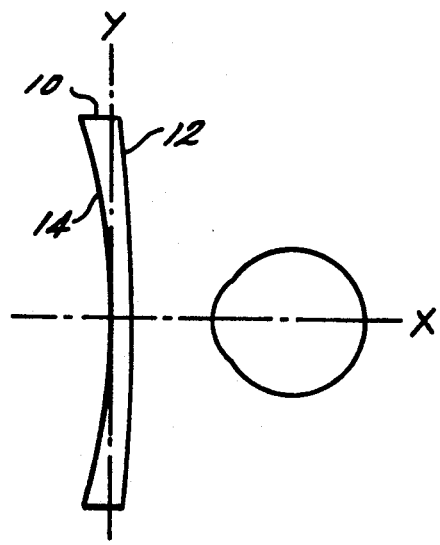
FIG. 1 illustrates the first step in the conceptual development of the aspheric surface of the invention, wherein a lens having a convex spherical surface and a concave conicoidal surface is placed in front of the eye, with the convex side facing the eye.

In accordance with the present invention, ophthalmic spectacle lenses are provided for the correction of distance vision incorporating a continuous convex aspherical front surface that affords improvements over conventional best form lenses as well as over existing non-conventional lenses having aspheric surfaces.

In particular, the present invention provides ophthalmic lenses of both plus and minus power having reduced edge and center thicknesses, reduced flat plate thickness and improved performance, and whose concave sides can be generated, ground and polished using standard prescription laboratory machinery. In both cases (i.e., plus and minus power lenses) the rear concave surfaces are comprised of any suitable conventionally shaped surfaces and are preferably comprised of spherical or toroidal surfaces, which can be provided either by the manufacturer or by the use of conventional prescription laboratory machinery.

The invention consists of a lens whose continuous convex front surface is axially symmetric and is of a special aspherical form, here referred to as an "inside-out" conicoid. The mathematical construction of such a surface is analogous to turning an orange peel inside out: a lens having a concave conicoidal surface is mathematically turned inside out, so that the concave surface is converted into a convex one. When the conic constant of the concave conicoid that is turned inside-out is algebraically positive, the resulting convex inside-out surface is appropriate to the design of plus-powered lenses. When the conic constant of the concave conicoid that is turned inside out is algebraically negative, the resulting convex inside-out surface is appropriate to the design of minus-powered lenses. Although the inside-out surface so formed bears little resemblance to the conicoid from which it is derived, it is nevertheless uniquely specified by just three parameters, namely the axial curvature $k_0$ and conic constant K of the original concave conicoid, and the axial curvature $k_1$ of the final convex inside-out surface. Lens thickness and off-axis performance can be adjusted by adjusting the values of the parameters $k_0$ and K.

DESCRIPTION OF THE PREFERRED EMBODIMENTS

As already stated, it is an object of the present invention to provide ophthalmic lenses having reduced flat plate thickness and improved performance as compared with the corresponding characteristics of best form lenses. It is, of course, possible to reduce the flat plate thickness of a best form lens by replacing its surfaces with spherical surfaces having reduced curvatures, the relative values of these reduced curvatures being chosen in such a way as to give the same back vertex power as that of the best form lens. However, the off-axis optical performance of such a lens will be inferior to that of the best form lens. However, in accordance with the present invention, the lost performance can be restored by an appropriate aspherization of the front surface of the flatter lens. The present invention incorporates a particularly advantageous form of convex aspheric surface for the restoration of lost performance, namely the inside-out conicoid.

Figure 2:
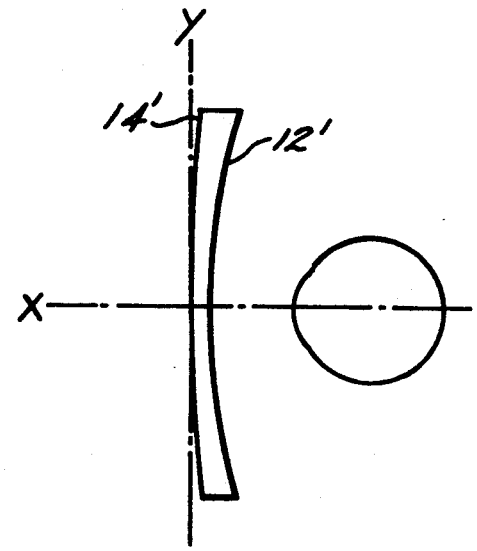
FIG. 2 illustrates conceptually the second step in the development of the aspheric surface of the invention, wherein the lens of FIG. 1 is bent in such a manner that the formerly convex spherical posterior surface becomes a concave spherical posterior surface, and the formerly concave conicoidal anterior surface becomes a convex inside-out conicoidal anterior surface.

The development of the inside-out conicoidal surface involves three steps, the first two of which are illustrated in FIGS. 1 and 2. It should be understood that the development pictured is presented as an aid to the teaching and understanding of the mathematical structure of the inside-out surface, and is not to be construed as representing a manufacturing process.

Step 1. FIG. 1 shows a lens 10 placed in front of the eye in an unorthodox manner, with the convex side facing the eye. The convex posterior surface 12 of this lens is of spherical or toroidal form, whereas the concave anterior surface 14 is of conicoidal form, i.e., a surface formed by rotating a conic section about an axis of symmetry. The relative values of the axial curvatures of these two surfaces are such as to give the required back vertex power for correction of distance vision.

Step 2. The second step, depicted in FIG. 2, is to bend the extremities of the lens uniformly towards the eye until the axial surface curvature of the anterior surface 14' attains a specified value flatter than that of the spherical anterior surface of the best form lens for the given back vertex power. After bending, the posterior surface 12' is still of spherical or toroidal form but is now concave. The convex aspherical anterior surface 14' so formed is the inside-out conicoid.

Step 3. The third and final step is to adjust the conic constant, i.e., a constant whose value specifies the type of conic section (circle, ellipse, parabola, etc.) of the conicoid that has been turned inside out until the off-axis performance matches or exceeds that of the more steeply curved best form lens. It may also be necessary to adjust the curvature of the concave spherical or toroidal surface to maintain the required back vertex power.

The mathematical form of the inside-out conicoid is readily derived. The derivation begins with the equation of a conicoid. With the vertex of the conicoid at the origin as shown in FIG. 1, the equation of the conicoid can be written [M. Jalie, *The Principles of Ophthalmic Lenses*, (Association of Dispensing Opticians, London, 1984), p. 517].

$$y^2 = 2Rx - (K+1)x^2 \qquad (1)$$

where x is the axis of rotational symmetry, y is the radial coordinate, R is the axial radius of curvature, and K is the conic constant (in Jalie's notation, $K+1=p$). The types of conicoid corresponding to different values of K are as follows:

| | |
|---|---|
| $-\infty < K < -1$ | hyperboloid |
| $K = -1$ | paraboloid |
| $-1 < K < 0$ | prolate ellipsoid |
| $K = 0$ | sphere |
| $0 < K < \infty$ | oblate ellipsoid |

Solving equation (1) for x gives $$x = \{R \pm [R^2 - (K+1)y^2]^{\frac{1}{2}}\}/(K+1), \qquad (2)$$

where for $R > 0$ (center of curvature to the right of the vertex) the minus sign must be taken, and for $R < 0$ (center of curvature to the left of the vertex) the plus sign must be taken. The curvature $k_c(y)$ of the conicoid along an axial section at aperture radius y is found to be (for either sign of R)

$$\begin{aligned} k_c(y) &= x''/(1 + x'^2)^{3/2} \\ &= (1/R)/(1 - Ky^2/R^2)^{3/2}. \end{aligned} \qquad (3)$$

Figure 3:
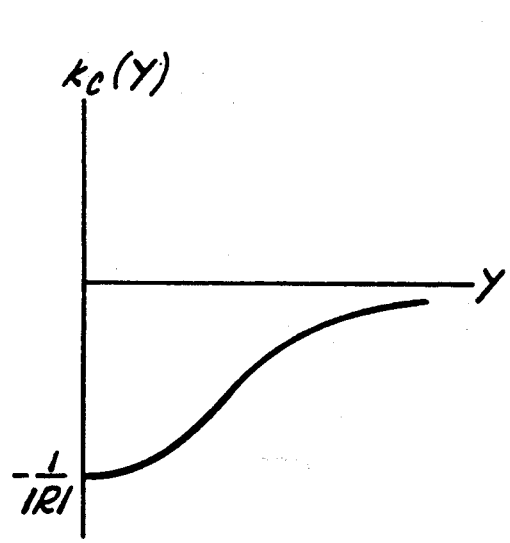
FIG. 3 shows the surface curvature along an axial section of a conicoid of hyperboloidal form.

Since the conicoid of FIG. 1 is concave to the left, its axial curvature $1/R$ and general curvature function $k_c(y)$ are algebraically negative. The general form of this curvature function for the case that the conicoid is hyperboloidal is sketched in FIG. 3. To obtain the curvature function $k(y)$ of the inside-out conicoid depicted in FIG. 2, it is only necessary to add a positive constant B to the function $k_c(y)$ defined by Equation (3):

$$\begin{aligned} k(y) &= B + k_c(y) \\ &= B + k_0/(1 - Kk_0^2 y^2)^{3/2} \end{aligned} \qquad (4)$$

where $k_0 = 1/R$. Let $k_1$ denote the axial curvature $k(0)$ of the inside-out conicoid of FIG. 2. Then from Equation (4), $$k_1 = B + k_0, \qquad (5)$$

and from Equations (4) and (5), the curvature function of the inside-out conicoid at aperture radius y can finally be written $$k(y) = k_1 - k_0 + k_0/(1 - Kk_0^2 y^2)^{3/2}, \quad (6)$$

where $k_0$ = axial curvature of concave conicoid prior to being turned inside-out (a negative number in this sign convention)

$k_1$ = axial curvature of convex aspherical front surface (a positive number)

K = conic constant of the concave conicoid prior to being turned inside out (positive or negative, depending on application).

Figure 4:
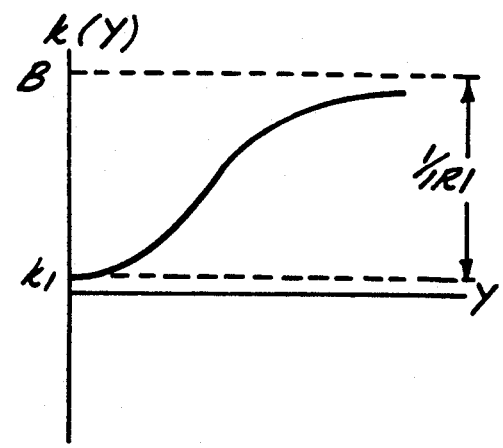
FIG. 4 shows the surface curvature along an axial section of an inside-out conicoid of inside-out hyperboloidal form.

The curvature function of Equation (6) is everywhere positive; the corresponding surface is therefore concave to the right, as is usual in the case of ophthalmic spectacle lenses. The general form of k(y) is depicted in FIG. 4 which replicates the curve of FIG. 3 shifted upward by the constant B.

A knowledge of the curvature function k(y) is sufficient to define the equation of the inside-out surface itself. It is given by the definite integral $$x(y) = \int_0^y \tan\theta \, dy, \quad (7)$$

where $$\sin\theta = \int_0^y k(y) \, dy, \quad (8)$$

as may be verified by direct substitution into the general expression for curvature $$k(y) = x''/(1 + x'^2)^{3/2}. \quad (9)$$

Some general rules for selecting the values of the parameters $k_0$, $k_1$ and K will now be given.

Although the curvature $k_1$ will invariably be flatter than the front surface curvature of the corresponding best form sphere, there are practical limitations to the degree of flatness that can be attained. For plus lenses, the flatness of the front surface is limited by such practical considerations as eyelash clearance at the back surface, reflection of light from the back surface, and the ability of prescription laboratory machinery to generate concave surfaces of long radius. For minus power lenses, the only practical restriction on the anterior surface is that it be convex.

To optimize off-axis performance and achieve the desired thickness reductions the conic constant K must be positive for plus power lenses, and negative for minus power lenses.

To define a particular inside-out surface it is necessary to specify the value of the "reference curvature" $k_0$ appearing in Equation (6). Let $k_2$ denote the characteristic curvature of the concave spherical or toroidal back curve of the lens of the invention. Experience shows that a value of $k_0 = -k_2$, together with an appropriate choice of the value of the conic constant K, generally yields the best off-axis performance. For this case $$k(y) = k_1 + k_2 - k_2/(1 - Kk_2^2 y^2)^{3/2}, \quad (10)$$

where $k_2$ = characteristic curvature of the concave spherical or torical back surface (a positive number).

Let D denote the curvature of the inside-out surface at aperture radius $y_0$, relative to the axial curvature $k_1 = k(0)$:

$$D = k(y_0) - k(0), \quad (11)$$

where $k(y_0)$ is given by Equation (10), or more generally by Equation (6), evaluated at $y = y_0$. For present purposes, $y_0$ represents an aperture radius near the edge of the lens. The curvature "drop" D at $y_0$ generally is negative for plus power lenses, and positive for minus power lenses. The drop D is an important indicator of the severity of the asphere; the larger its magnitude, the more severe the asphere. Suppose that a curvature function k(y) corresponding to a certain combination of values of $k_0$ and K has been found, and that this function yields a drop D at aperture radius $y_0$. According to Equation (6) there exists an infinite number number of pairs of values of $k_0$ and K that yield this same value of D. Such pairs may be found from the formula, obtained by solving Equation (6) for K with $y = y_0$, $$K = [1 - (1 + D/k_0)^{-\frac{2}{3}}]/(k_0 y_0)^2. \quad (12)$$

It may happen that one or the other of these pairs of $k_0$ and K give better performance for the same drop D than the original pair.

Alternatively, one can begin the design of a particular embodiment by choosing a value of D at radius $y_0$. A table of pairs of values of $k_0$ and K that give the chosen value of D can then be developed from Equation (12). From these pairs, one pair can be selected that produces the desired lens thickness and off-axis performance characteristics.

To facilitate a comparison between prior art lenses and those of the present invention, it is convenient to have a figure of merit for off-axis performance. The following very simple figure of merit, $\sigma$, which neglects chromatic aberration and is restricted to lenses having spherical back surfaces, will be employed for purposes of illustration:

$$\sigma = |MOE| + |OAE| \quad (13)$$

where, as previously noted, MOE denotes the mean oblique power error [arithmetic mean of the tangential (T) and saggital (S) errors] and OAE denotes the oblique astigmatic error (T−S), both errors being measured in diopters (D). Roughly speaking, a $\sigma$ value of 0.25 D represents the just observable total error. The value of $\sigma$ varies with viewing angle, and lenses are typically compared for a 30° rotation of the eye from the forward direction.

Figure 5:
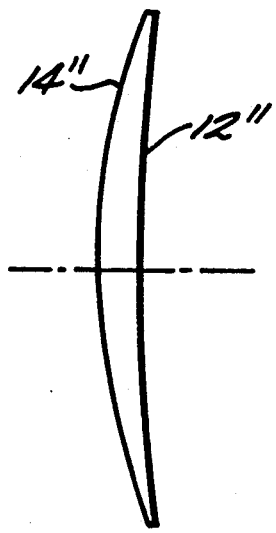
FIG. 5 depicts an axial cross section of a $+5.00$ D power lens of the invention.
Figure 7:
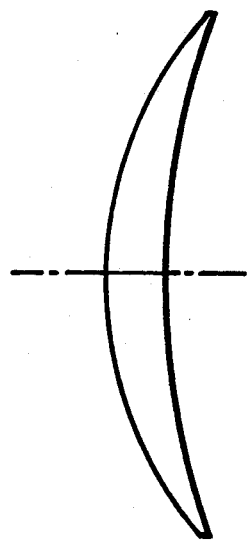
FIG. 7 depicts an axial cross section of a $+5.00$ D power best form lens.

FIG. 5 depicts a plus power lens constructed in accordance with the invention. It may be compared with the plus power best form lens shown in FIG. 7. The convex, inside-out conicoidal front surface 14" of FIG. 5 is described algebraically by Equation (6) with K > 0. That is, for plus power lenses, the conicoid that is turned inside-out is an oblate ellipsoid. The concave back surface 12" of the lens is spherical or toroidal depending on whether astigmatism requiring correction is present or not.

Figure 6:
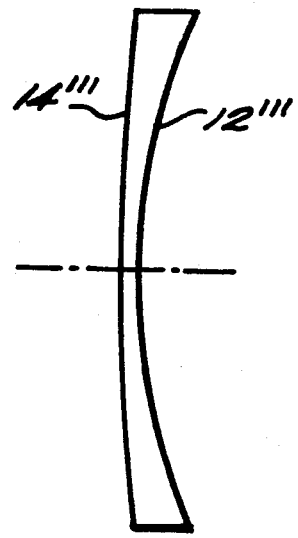
FIG. 6 depicts an axial cross section of a $-5.00$ D power lens of the invention.
Figure 8:
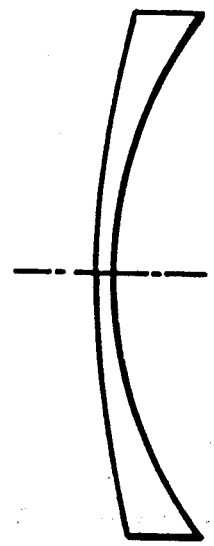
FIG. 8 depicts an axial cross section of a $-5.00$ D power best form lens.

FIG. 6 depicts a minus power lens constructed in accordance with the invention. It is to be compared with the minus power best form lens shown in FIG. 8.

The convex, inside-out conicoidal front surface 14''' of FIG. 6 is described algebraically by Equation (6) with K<0. That is, for minus power lenses, the conicoid that is turned inside-out is either a prolate ellipsoid, a paraboloid or a hyperboloid. As in the case of the plus lens, the concave back surface of the lens is spherical or toroidal depending on whether astigmatism requiring correction is present or not.

By design, all lenses of the invention, whether of plus or minus power, have reduced flat plate thicknesses in comparison with best form lenses having the same back vertex power and refractive index. Moreover, the center thicknesses of the plus power lenses, and the edge thickness of the minus power lenses of the invention, are reduced in comparison to the corresponding thicknesses of best form lenses, and even to those of prior art aspheric lenses having the same axial front surface power. These thickness reductions translate into improved cosmesis and a reduction of weight over previously known lenses. Significantly, the gains in cosmesis and weight are accompanied by gains in off-axis performance as well. This will now be demonstrated by way of the examples presented in Tables II and III.

TABLE II

COMPARISON OF LENSES OF +5.00 D POWER.
N = 1.498, EDGE THICKNESS = 1.0 MM,
DIAMETER = 71 MM. OBJECT DISTANCE = 10,000 M.

|  | Best form sphere[a] | Flattened sphere[b] | Prior art asphere[b] | Lens of the invention[b] |
| --- | --- | --- | --- | --- |
| K | — | — | −1.75 | 15.4 |
| 530k$_0$ (D) | — | — | — | −3.00 |
| Axial convex surf pwr (D) | 9.80 | 7.10 | 7.10 | 7.10 |
| Convex surf pwr @ 35 mm | 9.80 | 7.10 | 4.38 | −1.96 |
| Drop D @ 35 mm (D) | 0.00 | 0.00 | 2.72 | 9.06 |
| Axial concave surf pwr (D) | −5.00 | −2.03 | −2.00 | −1.99 |
| T error @ 30° (D) | −0.14 | 0.66 | °−0.26 | −0.13 |
| S error @ 30° (D) | −0.23 | 0.01 | −0.26 | −0.20 |
| MOE @ 30° (D) | −0.19 | 0.34 | −0.26 | −0.17 |
| OAE @ 30° (D) | 0.09 | 0.65 | 0.00 | 0.07 |
| σ @ 30° (D) | 0.28 | 0.98 | 0.26 | 0.23 |
| Flat plate thickness (mm) | 14.28 | 9.98 | 9.11 | 8.92 |
| Center thickness (mm) | 8.17 | 7.56 | 6.72 | 6.54 |

[a]Center of rotation distance = 28.5 mm.
[b]Center of rotation distance = 25.0 mm.

TABLE III

COMPARISON OF LENSES OF POWER −5.00 D.
N = 1.498, CENTER THICKNESS = 2.2 MM,
DIAMETER = 71 MM. OBJECT DISTANCE = 10,000 M.

|  | Best form sphere[a] | Flattened sphere[b] | Prior art asphere[b] | Lens of the invention[b] |
| --- | --- | --- | --- | --- |
| K | — | — | 64 | −2.8 |
| 530k$_0$ (D) | — | — | — | −6.00 |
| Axial convex surf pwr (D) | 3.90 | 0.75 | 1.60 | 0.75 |
| Convex surf pwr @ 35 mm | 3.90 | 0.75 | 10.49 | 3.27 |
| Drop D @ 35 mm (D) | 0.00 | 0.00 | 8.89 | 2.52 |
| Axial concave surf Pwr (D) | −9.24 | −6.07 | −6.93 | −6.07 |
| T error @ 30° (D) | 0.17 | −0.76 | −0.04 | 0.09 |
| S error @ 30° (D) | 0.17 | −0.10 | 0.09 | 0.13 |
| MOE @ 30° (D) | 0.17 | −0.43 | 0.03 | 0.11 |
| OAE @ 30° (D) | 0.00 | −0.66 | −0.13 | −0.04 |
| σ @ 30° (D) | 0.18 | 1.08 | 0.16 | 0.15 |
| Flat plate thickness (mm) | 14.51 | 9.75 | 10.93 | 9.75 |
| Edge thickness (mm) | 9.79 | 8.85 | 8.40 | 8.19 |

[a]Center of rotation distance = 28.5 mm.
[b]Center of rotation distance = 25.0 mm.

TABLE II compares a +5.00 D power embodiment of the present invention with three types of prior art lens of the same power: a best form lens with spherical surfaces, a flatter lens with spherical surfaces, and a prior art aspherical lens of the Jalie patent type having a convex hyperboloidal front surface (conic constant −1.75) and spherical back surface. The front surface of the lens of the invention is an inside-out oblate ellipsoid (conic constant 15.4). The lens of the invention can be seen to have a reduced flat plate thickness, reduced center thickness, and somewhat improved off-axis performance relative to the corresponding characteristics of the prior art lenses.

Similarly, TABLE III compares a −5.00 D lens of the invention with the same three types of prior art lens; the prior art asphere in this case incorporates a convex oblate ellipsoidal front surface (conic constant 15.4). The front surface of the lens of the invention is an inside-out hyperboloid (conic constant −2.8). Again, the lens of the invention provides improvement over all three prior art lenses in that it exhibits reduced flat plate thickness, reduced edge thickness, and somewhat improved off-axis performance.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An ophthalmic lens, including:
   a continuous convex front surface of aspherical form; and
   a concave rear surface;
   said continuous convex front surface of aspherical form being a surface which can be defined mathematically as an inside-out conicoid.

2. The ophthalmic lens of claim 1 wherein:
   said lens is a plus power lens.

3. The ophthalmic lens of claim 1 wherein:
   said lens is a minus power lens.

4. The ophthalmic lens of claim 1 wherein:
   said convex front surface of aspherical form is axially symmetric and defined by the curvature function $k(y)$ at aperature radius y as follows:

$$k(y) = k_1 - k_0 + k_0/(1 - Kk_0^2 y^2)^{3/2},$$

where $k_0$ = axial curvature of a concave conicoid prior to being turned inside out;

$k_1$ = axial curvature of convex aspherical front surface, and

K=conic constant of a concave conicoid prior to being turned inside out.

5. The ophthalmic lens of claim 4 wherein:
$k_0$=a negative number; and
$k_1$=a positive number.

6. The ophthalmic lens of claim 4 wherein:
K is positive for plus power lenses.

7. The ophthalmic lens of claim 4 wherein:
K is negative for minus power lenses.

8. The ophthalmic lens of claim 1 wherein:
said convex front surface of aspherical form is axially symmetric and defined by the curvature of function $k(y)$ at aperature radius y as follows:

$$k(y) = k_1 + k_2 - k_2/(1 - Kk_2^2 y^2)^{3/2},$$

where
$k_1$=axial curvature of convex aspherical front surface;
$k_2$=characteristic curvature of the concave spherical or torical back surface, and
K=conic constant of the concave conicoid that is turned inside out.

9. The ophthalmic lens of claim 8 wherein:
$k_1$ and $k_2$ comprise positive numbers.

10. The ophthalmic lens of claim 8 wherein:
K is positive for plus power lenses.

11. The ophthalmic lens of claim 8 wherein:
K is negative for minus power lenses.

12. The ophthalmic lens of claim 1 wherein the conic constant (K) associated with the aspherical form of said convex front surface is defined by:

$$K = [1 - (1 + D/k_0)^{-\frac{1}{2}}]/(k_0 y_0)^2$$

where
K=conic constant of a concave conicoid prior to being turned inside out;
D=curvature of the inside out surface at aperture radius $y_0$, relative to the axial curvature $k_1$;
$k_0$=axial curvature of a concave conicoid prior to being turned inside out; and
$y_0$=a selected value of aperture radius y.

13. The ophthalmic lens of claim 12 wherein:
$k_0$=a negative number.

14. The ophthalmic lens of claim 1 wherein:
said concave rear surface is of either spherical or toroidal shape.

15. A method of forming an ophthalmic lens, including the steps of:
forming a continuous convex front surface of aspherical shape on a lens; and
forming a continuous concave rear surface;
said continuous convex front surface of aspherical shape being a surface which can be defined mathematically as an inside out conicoid.

16. The method of claim 15 wherein said step of forming a convex front surface includes:
forming a front surface to define a plus power lens.

17. The method of claim 15 wherein said step of forming a convex front surface includes:
forming a convex front surface to define a minus power lens.

18. The method of claim 15 wherein:
said convex front surface of aspherical form is axially symmetric and defined by the curvature function $k(y)$ at aperature radius y as follows:

$$k(y) = k_1 - k_0 + k_0/(1 - Kk_0^2 y^2)^{3/2},$$

where
$k_0$=axial curvature of a concave conicoid prior to being turned inside out;
$k_1$=axial curvature of convex aspherical front surface, and
K=conic constant of a concave conicoid prior to being turned inside out.

19. The method of claim 18 wherein:
$k_0$=a negative number; and
$k_1$=a positive number.

20. The method of claim 16 wherein:
K is positive for plus power lenses.

21. The method of claim 16 wherein:
K is negative for minus power lenses.

22. The method of claim 15 wherein:
said convex front surface of aspherical form is axially symmetric and defined by the curvature of function $k(y)$ at aperature radius y as follows:

$$k(y) = k_1 + k_2 - k_2/(1 - Kk_2^2 y^2)^{3/2},$$

where
$k_1$=axial curvature of convex aspherical front surface;
$k_2$=characteristic curvature of the concave spherical or torical back surface, and
K=conic constant of the concave conicoid that is turned inside out.

23. The method of claim 22 wherein:
$k_1$ and $k_2$ comprise positive numbers.

24. The method of claim 22 wherein:
K is positive for plus power lenses.

25. The method of claim 22 wherein:
K is negative for minus power lenses.

26. The method of claim 15 wherein the conic constant (K) associated with the aspherical form of said convex front surface is defined by:

$$K = [1 - (1 + D/k_0)^{-\frac{1}{2}}]/(k_0 y_0)^2$$

where
K=conic constant of a concave conicoid prior to being turned inside out;
D=curvature of the inside out surface at aperture radius $y_0$, relative to the axial curvature $k_1$;
$k_0$=axial curvature of a concave conicoid prior to being turned inside out; and
$y_0$=a selected value of aperture radius y.

27. The method of claim 22 wherein:
said concave rear surface is of either spherical or toroidal shape.

* * * * *